April 15, 1952 E. A. GLYNN 2,593,137
TREAD CENTERING MECHANISM FOR TIRE MOLDS
Filed April 17, 1950 2 SHEETS—SHEET 1

Inventor
Edwin A. Glynn
By
ATTORNEYS

April 15, 1952     E. A. GLYNN     2,593,137
TREAD CENTERING MECHANISM FOR TIRE MOLDS
Filed April 17, 1950     2 SHEETS—SHEET 2
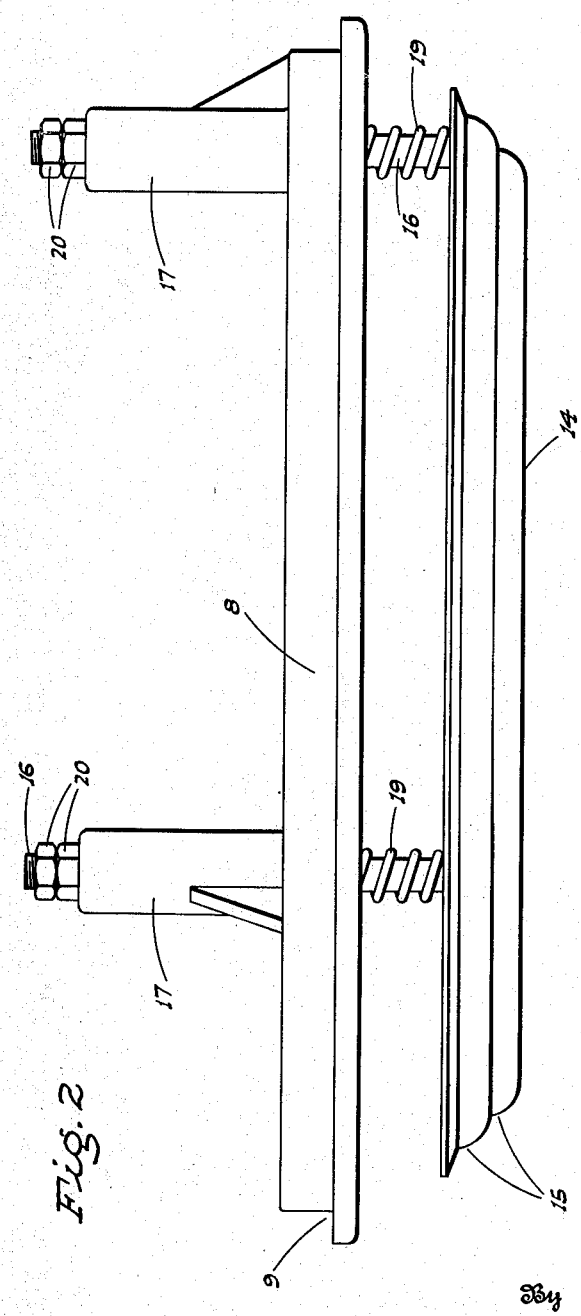
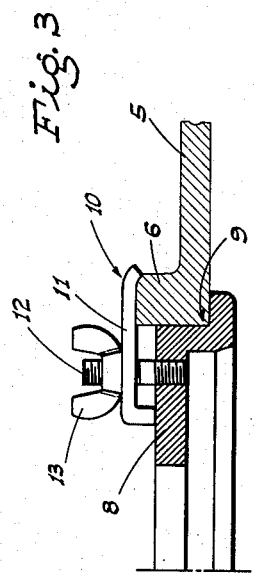
Inventor
Edwin A. Glynn
By
ATTORNEYS Patented Apr. 15, 1952

2,593,137

UNITED STATES PATENT OFFICE 2,593,137

TREAD CENTERING MECHANISM FOR TIRE MOLDS

Edwin A. Glynn, Lodi, Calif., assignor to Super Mold Corporation of California, Lodi, Calif., a corporation of California Application April 17, 1950, Serial No. 156,447

3 Claims. (Cl. 18—18)

This invention relates in general to the art of tire retreading, and in particular is directed to improvements in a tire retreading mold.

A major object of this invention is to provide a novel mechanism, for a tire retreading mold, which is operative to assure that the tire—including the new tread portion or camelback thereon—is properly positioned in the mold before the tread vulcanizing operation is begun; the purpose being to avoid "off-center" treads; i. e. a new tread which is not straight and true about the tire.

Another important object of this invention is to provide a tread centering mechanism, for a tire mold, which comprises a novel assembly of rings positioned on the mold in a manner to work in cooperation with the tire beads to initially reduce the diameter of the tire and permit proper seating and alinement of the tread in the matrix upon closing of the mold, and to thereafter permit of return of the tire, when inflated in the mold, to normal diameter.

A further object of this invention is to provide a tread centering mechanism, as in the preceding paragraph, wherein the tire bead engaging rings are capable of motion axially, being spring-pressed inwardly but yieldably outwardly; such rings—upon closing of the mold—shifting the tire beads inwardly or toward each other to reduce the tire diameter so that the tread may center in the mold, but yielding outwardly upon inflation of the tire so that the latter then returns to normal diameter, fitting tightly in the mold.

An additional object of the invention is to provide a tread centering mechanism which includes a novel mount for attaching the tire bead engaging rings to a tire mold.

It is also an object of the invention to provide a tire centering mechanism which is designed for ease and economy of manufacture.

Still another object of the invention is to provide a practical and reliable tread centering mechanism and one which will be exceedingly effective for the purpose for which it is designed.

These objects are accomplished by means of such structure and relative arrangement of parts as will fully appear by a perusal of the following specification and claims.

In the drawings:

Fig. 2 is an elevation of one of the tire bead engaging rings and its mount, detached.

Fig. 3 is a fragmentary radial section showing one of the attachment clip units.

Figure 1:
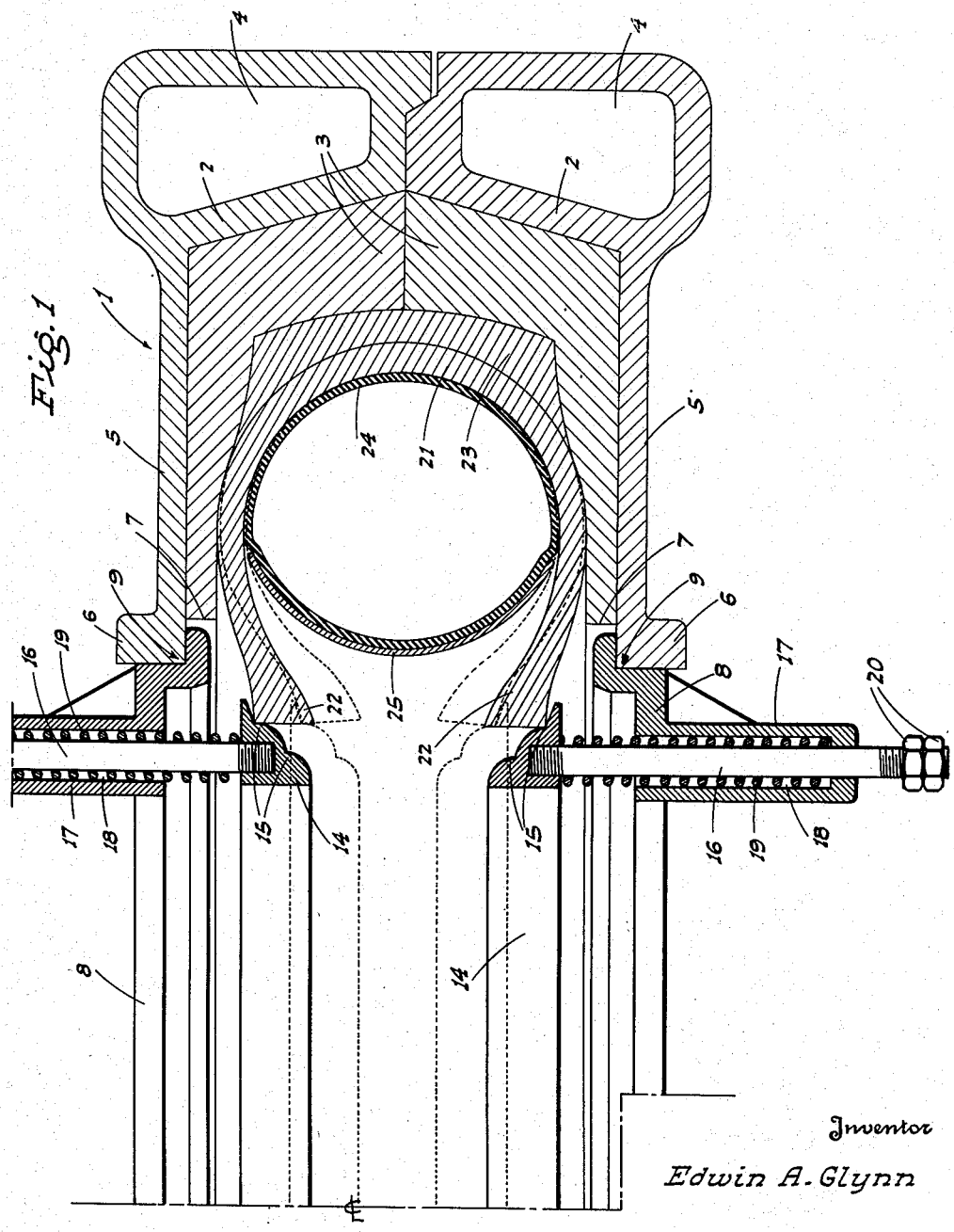
Fig. 1 is a radial section of a tire retreading mold having the tread centering mechanism mounted thereon.

Referring now more particularly to the characters of reference on the drawings, the present invention is adapted to be employed in connection with a tire retreading mold of the type which includes an annular body, indicated generally at 1, which body is comprised of a pair of initially separate mold halves 2 of annular configuration; such mold halves being mounted, by means not here shown, for powered opening and closing motion relative to each other.

The annular mold body 1 encloses an annular matrix comprised of matching matrix halves 3 secured in corresponding mold halves 2; the latter each having a steam chamber 4 therein for the purpose of heating the mold.

Each mold half 2 includes an inwardly extending skirt 5 formed, at its inner edge, with an annular strengthening flange 6; such flange 6 projecting radially inwardly beyond the adjacent inner edge 7 of the corresponding matrix half 3.

The tread centering mechanism, which comprises the present invention, is constructed and mounted on the mold, as follows:

Each mold half 2 is fitted, radially inwardly of its skirt 5, with an annular mounting plate 8 circumferentially notched, as at 9, with the corresponding flange 6 seating in such notch; the notch opening outwardly so that the mounting plate 8 is moved into place from inside said mold half.

Each mounting plate 8 is rigidly held in place by a plurality of circumferentially spaced attachment clip units, one of which is indicated generally at 10 in Fig. 3. Each such attachment clip unit 10 includes a clip 11 which spans between the adjacent mounting plate 8 and flange 6, and the clip is held in place by a bolt 12 having a wing nut 13 threaded thereon.

With the foregoing arrangement each mounting plate 8 can be readily and conveniently attached to the mold half 2 of an existing tire retreading mold.

Axially inwardly of each mounting plate 8 there is disposed, in concentric relation, an annular, tire bead engaging ring 14, and the inner faces of said rings 14 are formed with staggered or radially offset tire bead receiving seats 15 which extend annularly about said rings.

At circumferentially spaced points the rings 14 are fitted with elongated pins 16 which project outwardly from said rings parallel to the axes thereof; such pins extending through elongated bosses 17 formed on the corresponding mounting plates 8.

Each boss 17 is formed, from its inner end, with a relatively deep spring socket 18 and a relatively heavy-duty compression spring 19 seats in said socket in surrounding relation to the adjacent pin 16 and abuts against the related ring 14. Stop nuts 20 on the outer ends of the pins 16 limit the extent to which the compression springs 19, which are always loaded, may urge the rings 14 axially inward.

For the purpose of illustration, the tire to be retreaded is indicated at 21; the tire beads at 22; and the new tread material or camelback at 23.

When the tire retreading mold is in use with the above described mechanism thereon, the latter functions as follows:

Before the tire, indicated generally at 21, is placed in the mold, an inside curing bag 24, mounted on a rigid true circle inside curing rim 25 is inserted within the tire casing, the bag 24 then being deflated. The tire is then placed in the lower half of the mold. The mold halves 2, together with the matrix halves 3, are then closed, by power, from their initially open position. As the mold thus closes, the rings 14 engage the adjacent tire beads 22 and press them toward each other, as—for example—between the full line positions and dotted line positions as in Fig. 1; the tire beads 22 falling into the proper one of the annular seats 15. The movement of the tire beads toward each other has the effect of pulling the tire side walls uniformly about the outer edges of the true circle curing rim 25 so as to reduce the diameter of the tire 1 so that it freely engages in the mold and may assume a correct seat therein, with the new tread material or camelback 23 properly positioned or centered in the matrix.

After closing of the mold the curing bag 24 is inflated. With this inflation of the curing bag the tire 21 is caused to reassume its normal diameter, positively forcing the new tread material or camelback 23 in proper position into the matrix comprised of the matrix halves 3, and at the same time the tire beads 22 are forced apart and returned to substantially their normal position. As the tire beads 22 are thus first pulled together and then forced apart, the tire bead engaging rings 14 are correspondingly shifted axially first inwardly and then outwardly while held in proper centered position both radially and axially of the mold. When moving outwardly, they are guided by the pins 16 and move against the compression of the springs 19. As a result the tire beads 22, during the following tread vulcanizing process, are maintained alined in directions both axially and radially of the mold; thus assuring that the tire 21 must remain in the mold in such position that the new tread is properly centered and cured straight and true on the tread of the tire.

The tread centering mechanism, as described herein, is of particular advantage for use in connection with the retreading of low pressure type balloon tires which are characterized by sidewalls which are extremely flexible. This flexibility makes it difficult to properly position a tire in the mold without the tread centering mechanism to which the present invention is directed. Such mechanism, once mounted on a mold, is entirely automatic in its operation, and functions most effectively to the desired end.

"Retreading" as the term is used herein, is intended to mean tire tread replacement by top capping full capping, or full retreading.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A full-circle tire mold including a body and a matrix therein; the body and matrix terminating radially out from the beads of a tire to be confined in the mold; a tread centering device comprising a pair of axially alined and separated rings having annular tire-bead engaging seats, the rings being disposed radially and laterally inward from the body and matrix and clear of the same, means supporting the rings from the body concentric with the axis thereof and for movement in a direction axially of the mold, and spring means yieldably urging the rings toward each other.

2. A full-circle tire mold including a body and a matrix therein; the body and matrix terminating radially out from the beads of a tire to be confined in the mold; a tread centering device comprising a pair of axially alined and separated rings having annular tire-bead engaging seats, the rings being disposed radially and laterally inward from the body and matrix and clear of the same, ring-like mounting plates engaging and supported from the body at its radially inner termination, pins secured in the rings parallel to the axis thereof and slidably supported in the plates, and compression springs between the plates and rings.

3. A full-circle mold including a body and a matrix therein; the body and matrix terminating radially out from the beads of a tire to be confined in the mold; a tread centering device comprising a pair of axially alined and separated rings having annular tire-bead engaging seats, the rings being disposed radially and laterally inward from the body and matrix and clear of the same, ring-like mounting plates engaging and supported from the body at its radially inner termination, pins secured in the rings parallel to the axis thereof and projecting laterally out therefrom, compression springs about the pins, and elongated bosses on the plate projecting laterally out therefrom and disposed about the corresponding portions of the pins and springs; the bosses at their outer end slidably embracing and supporting the pins and the springs bearing at one end against said outer end of the bosses and at the other end against the ring.

EDWIN A. GLYNN.

REFERENCES CITED

The following references are of record in the file of this patent:

UNITED STATES PATENTS

| Number | Name | Date |
|---|---|---|
| 1,989,634 | Iverson | Jan. 29, 1935 |

FOREIGN PATENTS

| Number | Country | Date |
|---|---|---|
| 30,774 of 1930 | Australia | June 29, 1931 |